UNITED STATES PATENT OFFICE.

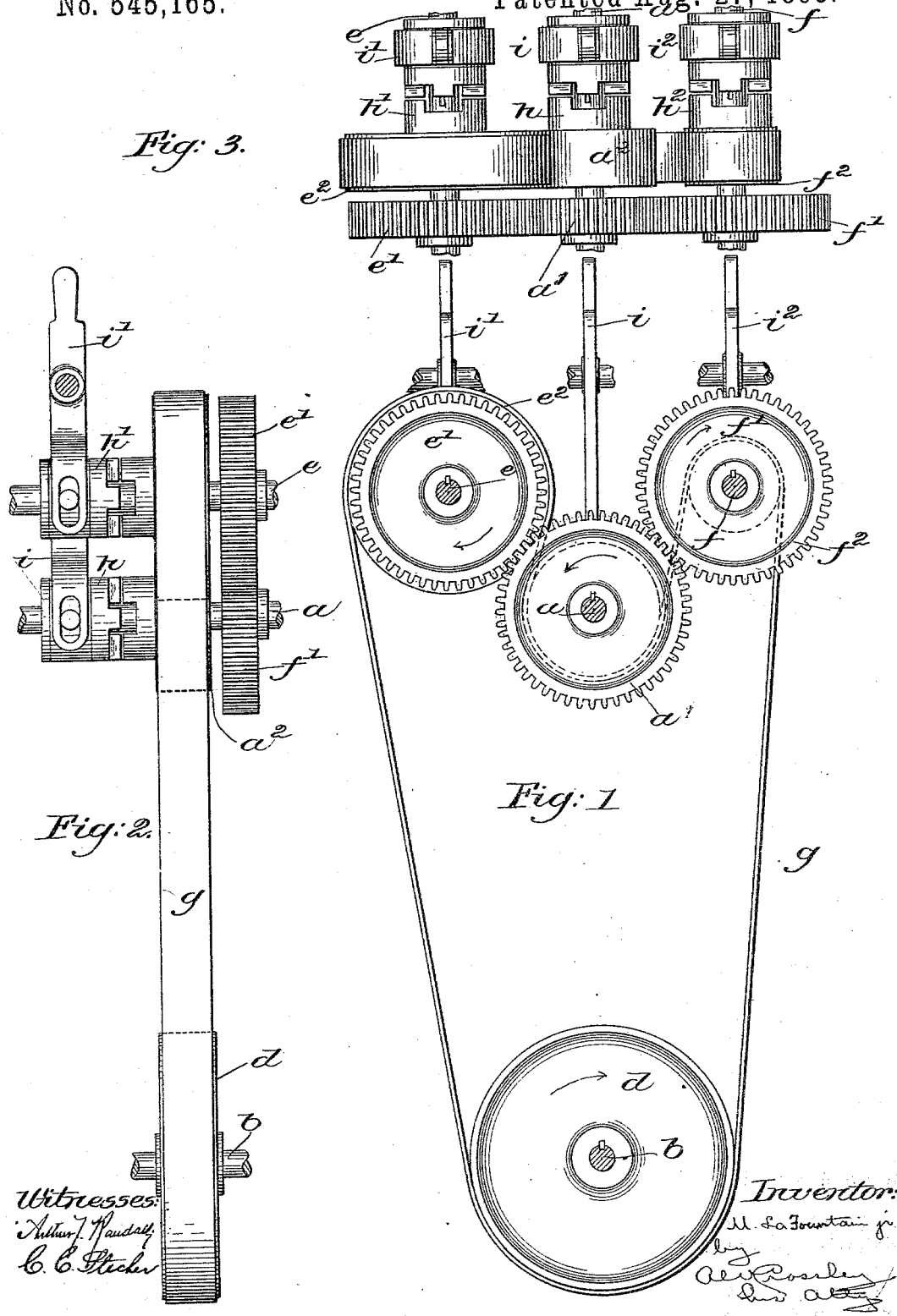

MAXIM LA FOUNTAIN, JR., OF SPRINGFIELD, VERMONT.

POWER-TRANSMITTING MECHANISM.

SPECIFICATION forming part of Letters Patent No. 545,165, dated August 27, 1895.

Application filed January 5, 1895. Serial No. 533,983. (No model.)

*To all whom it may concern:*

Be it known that I, MAXIM LA FOUNTAIN, Jr., of Springfield, in the county of Windsor and State of Vermont, have invented certain new and useful Improvements in Power-Transmitting Mechanism, of which the following is a specification.

This invention is designed for use on machinery of all kinds in place of the cone-pulleys now in use, the object of the invention being to provide an arrangement of shafting, gearing, and belting whereby different speeds may be imparted from a driving-shaft to a driven shaft without shifting the belt.

To those acquainted with machinery in which cone-pulleys are used it is well known that there are many disadvantages incident to the use of such pulleys, it being more or less troublesome and taking more or less time to shift the belt from one part of the cone to another. This invention is designed to obviate those difficulties incident to the use of cone-pulleys by stretching the driving-belt upon two or more differently-speeded pulleys which can be alternately driven by the driving-shaft without shifting the belt.

My invention, therefore, consists in loosely mounting pulleys of different diameters upon separate shafts driven by the driving-shaft and passing the belt around all of them, there being a clutch mechanism for connecting each pulley with its shaft.

It will be understood that while I have chosen the form shown in the drawings and hereinafter described as best illustrating my invention, yet I do not limit myself to all the details or to the exact arrangement shown, as many changes therefrom may be made without departing from the spirit and scope of my invention.

In the drawings, Figure 1 is a face view of the pulleys, showing the shafts in section. Fig. 2 is a side view of the same, and Fig. 3 is a plan view.

The prime power or main driving-shaft, having a uniform speed of rotation, is indicated by $a$, while the driven shaft, to which it is desired to impart different speeds, is indicated by $b$. Arranged parallel to the shaft $a$ and a short distance therefrom are supplemental shafts $e\ f$, which receive power from the driving-shaft $a$. Any power-transmitting mechanism may be used; but I prefer to employ straight-spur gearing.

Keyed on shaft $a$ is a gear-wheel $a'$, which is in engagement with and drives wheels $e'\ f'$, mounted rigidly upon shafts $e\ f$, respectively. These gear-wheels are preferably of the same diameter, although they may vary, if desired.

Mounted loosely upon shafts $a, e,$ and $f$ are belt-pulleys $a^2, e^2,$ and $f^2$, around which the belt $g$ passes, it traveling from thence downward and around the driven pulley $d$, keyed to shaft $b$. The pulleys are of any different diameters that may be desired. Those at $a^2$ impart to pulley $d$ the normal speed of rotation, while those at $e^2$ and $f^2$ impart a faster and a slower speed, respectively. The driving-pulleys are, as above said, mounted loosely upon the shafts, so that in order to impart driving-power to one of them at a time I provide clutch mechanisms $h, h',$ and $h^2$ on the shafts, respectively, for connecting the pulleys thereto. Any form of clutch device may be employed, though I have shown one for illustration as having clutch-teeth taking into and engaging an opposing member mounted on or connected to the hub of the pulley. The clutches are respectively and independently shifted into and out of engagement by means of the levers $i\ i'\ i^2$.

The operation of the device is extremely simple. When it is desired to impart a normal speed to the driven pulley, the clutch $h$ is shifted by means of lever $i$, so as to put pulley $a^2$ into engagement with its shaft $a$, the pulleys $e^2$ and $f^2$ remaining loose on the shafts. If, however, a greater speed of rotation is required, clutch $h$ is thrown out of engagement and clutch $h'$ is moved in, so as to connect pulley $e^2$ with shaft $c$, and the pulley $d$ is immediately rotated with a higher degree of speed. Clutch $h^2$ may be shifted in a similar manner to connect pulley $f^2$ with its shaft for imparting a relatively slower speed to the belt $g$ and shaft $b$.

What I claim is—

1. A power transmitting mechanism, comprising the following elements, namely; a power shaft, a driven shaft, a shaft supplemental to the aforesaid shafts, power transmitting means connecting said power shaft and said supplemental shaft, a pulley mounted loosely on said power shaft, a pulley mounted loosely on said supplemental shaft, a belt for imparting power to said driven shaft and passing continuously around said pulleys, and a clutch mechanism for connecting each pulley with its supporting shaft, substantially as set forth.

2. A power transmitting mechanism comprising the following elements, namely: a prime power shaft, a driven shaft, one or more shafts supplemental to said power shaft, gearing connecting said supplemental shafts continuously with said power shaft, a pulley mounted loosely on said prime power shaft and on each of said supplemental shafts said pulleys being of different diameters, independent clutch mechanisms for alternately connecting said pulleys with their shafts, and a belt continuously in engagement with said pulleys and adapted to receive different speeds therefrom, substantially as set forth.

In testimony whereof I have signed my name to this specification, in the presence of two subscribing witnesses, this 24th day of December, A. D. 1894.

MAXIM LA FOUNTAIN, JR.

Witnesses:
GEO. H. WHITCOMB,
M. L. LAWRENCE.